United States Patent [19]

Scriven et al.

[11] 4,046,729

[45] Sept. 6, 1977

[54] WATER-REDUCED URETHANE COATING COMPOSITIONS

[75] Inventors: Roger L. Scriven; Wen-Hsuan Chang, both of Gibsonia, Pa.

[73] Assignee: PPG Industries, Inc., Pittsburgh, Pa.

[21] Appl. No.: 583,085

[22] Filed: June 2, 1975

[51] Int. Cl.$^2$ .................. C08G 22/04; C08K 3/18; C08L 63/00
[52] U.S. Cl. .................. 260/29.2 TN; 106/243; 204/159.11; 204/159.19; 204/181; 260/29.3; 260/29.4 R; 428/425
[58] Field of Search ........... 260/29.2 TN, 77.5 AT, 260/77.5 AM, 77.5 Q, 77.5 CH, 18, 830 P, 841, 849, 29.3, 29.4 R

[56] References Cited

U.S. PATENT DOCUMENTS

| | | | |
|---|---|---|---|
| 3,488,272 | 1/1970 | Frisch et al. | 260/29.2 TN |
| 3,539,483 | 11/1970 | Keberle et al. | 260/29.2 TN |
| 3,804,786 | 4/1974 | Sekmakas | 260/29.2 TN |

FOREIGN PATENT DOCUMENTS

| | | | |
|---|---|---|---|
| 919,329 | 1/1973 | Canada | 260/29.2 TN |
| 1,278,426 | 6/1972 | United Kingdom | 260/29.2 TN |

*Primary Examiner*—Theodore E. Pertilla
*Attorney, Agent, or Firm*—William J. Uhl

[57] ABSTRACT

A water-diluted, ungelled, non-sedimenting polyurethane and a process for preparing such a polyurethane in the presence of water is disclosed. The polyurethanes are prepared so that they contain a high percentage of highly active hydrogens which enable the polyurethanes to be further reacted with a curing agent to form thermoset products. The polyurethanes of the present invention are prepared by first dispersing a partially reacted NCO-containing polymer in water, which is then chain extended with a material such as an organic diamine. Thermosetting compositions are made by adding curing agent to the chain extended material. Curing agents can also be incorporated into the polymer molecule either in the making of the partially reacted NCO-containing prepolymer or by further reaction with the partially reacted NCO-containing prepolymer. The water-dispersed polyurethanes of the present invention are excellent film formers, capable of making coatings with a wide spectrum of desirable properties. In addition, they can be added to other water-compatible compositions to improve flexibility, hardness, drying and other coating properties.

35 Claims, No Drawings

WATER-REDUCED URETHANE COATING COMPOSITIONS

BACKGROUND OF THE INVENTON

1. Field of the Invention:

The present invention relates to polyurethane resins, more particularly, to water-dispersed polyurethane resins which are film formers.

2. Brief Description of the Prior Art:

Water-dispersible polyurethanes are known in the art. For example, U.S. Pat. No. 2.968,575 to Mallonee discloses emulsifying NCO-containing prepolymers in a solution of diamine and water with the aid of detergents and under the action of powerful shearing forces. A chain lengthening reaction takes place as water and diamine diffuse into the droplets of the emulsion and react with the isocyanate. The resultant poly(urethane-urea) can then be further processed to form a coating. The process described in U.S. Pat. No. 2,968,575 has the disadvantage associated with it that in order to form the emulsion, a detergent must be used. The detergent usually finds its way into the resultant coating where it can seriously detract from the coating's overall physical and chemical properties. Besides, insufficient shearing force often results in unstable products, and the material can usually not be produced in typical reaction kettles because of the high shearing forces needed.

There have also been suggestions in the prior art to prepare fully reacted polyurethanes in organic solvent with internally contained salt groups which permit the polyurethane to be dispersed in water. For example, U.S. Pat. No. 3,479,310 to Dieterich et al discloses dispersing a fully chain extended, NCO-free polyurethane having internally contained ionic salt groups in water without the aid of detergent.

However, chain extended high molecular weight polyurethanes are very difficult to disperse satisfactorily in water. The resultant dispersions are fairly coarse and they require a high percentage of salt groups for stability. These high percentages of salt groups normally result in coatings which are moisture sensitive. In addition, because the high molecular weight polyurethanes are generally high in viscosity, they require extensive thinning with organic solvent before they have a sufficiently low viscosity for dispersion without high shearing forces. The excess solvent must later be removed by steam distillation or the like. Polyurethane dispersions of the present invention, on the other hand, which are prepared by first dispersing a low molecular weight partially reacted NCO-contained prepolymer which contains acid salt groups in an aqueous medium followed by chain extending in the aqueous medium have a finely particulated dispersed phase. By chain extending in aqueous medium we have found that only a relatively small percentage of salt groups is needed for satisfactory dispersion. In addition, the low molecular weight prepolymer materials have sufficiently low viscosities that they can be dispersed neat at room temperature or in the presence of small amounts of organic solvents. Further chain extension in water does not require additional solvent. It is believed that by making polyurethanes this way, the molecules of polyurethanes are coiled.

The idea of chain extending an NCO prepolymer with internally contained acid salt groups in water with an organic polyamine is generally expected to give gels due to the reaction of polyacids with polyamines. In fact, this method of making crosslinked polyurethanes was generally disclosed in Canadian Pat. No. 837,174 to Witt et al. This reference discloses the preparation of aqueous dispersions of highly crosslinked polyurethanes. The polyurethanes are prepared by dispersing an NCO-containing prepolymer which has internally contained acid salt groups in water. The prepolymer is reacted in water with a polyamine to give a highly crossliked product. Crosslinking can also occur by using polyvalent counter ions of the ionic groups in the polymer. The process and the products prepared from the Witt et al process differ from the present invention in that highly crosslinked polyurethanes are prepared rather than ungelled, solvent-soluble polyurethanes of the present invention. Highly crosslinked products are undesirable because they are not solvent-soluble and will not readily coalesce to form continuous films. For coating or adhesive usage, gel must be avoided. Witt et al do not teach how to make ungelled film-forming polyurethanes.

U.S. Pat. No. 3,868,350 discloses sedimenting aqueous solutions of thermoplastic polyurea powders made by reacting polyurethanes which contain free NCO groups and ionic groups with primary and/or secondary aliphatic diamines and/or dicarboxylic acid-bis-hydrazides at an NH to NCO ratio of from 0.1 to 0.95 in the presence of water. This patent acknowledges the difficulties in conforming ungelled or uncrosslinked polyurethanes by further reaction of NCO-polymers with chain extenders in the presence of water. The means U.S. Pat. No. 3,868,350 uses to form ungelled products is to react an NCO-polymer of a specified salt content with a stoichiometric deficit of a specified chain extender. The final polymer product must have specified urethane, urea and salt group contents. Although the resultant products are ungelled, they suffer from numerous shortcomings. The products are sedimenting and not stable dispersions. Further, since the products of U.S. Pat. No. 3,868,350 are prepared with specified chain extender in a stoichiometric deficit, and since the products must have a specified urethane, urea and salt group content, products of only a limited range of physical and chemical properties can be produced. Also, there is no highly active hydrogen reaction site on the prepolymer such as OH, $NH_2$ for further curing with melamine, epoxy or polyisocyanate. Besides the sedimented product cannot be used to make coatings without intensive heating (e.g., powder coatings) or strong organic solvents to dissolve the powders. Thus, conventional coating techniques such as spraying, dipping, electrodepositing, electrostatic spraying cannot be employed. Thus, the products of U.S. Pat. No. 3,868,350 are thermoplastic and no provision is made for making thermosetting products. The coatings of the present invention overcome many of the shortcomings of the prior art and in many instances give coatings of superior properties, such as better gloss, durability and adhesion.

Therefore, from the above, there are numerous shortcomings in the prior art relating to water-dispersed, non-gelled polyurethanes. It is surprising that ungelled polyurethane dispersions can be prepared by the present invention. Besides, the polyurethane dispersions of the present invention are also surprisingly superior to those of the prior art, overcoming many of their shortcomings. The polyurethane dispersions of the present invention are ungelled, solvent-soluble materials which are excellent film formers. They can easily be prepared not requiring detergent, high shearing forces, high temperature or excessive amounts of organic solvent for a satisfactory dispersion. The polyurethane dispersions of the present invention are stable or non-settling. By this is meant that after the dispersion is prepared, the dispersed phase remains in dispersion and will not form hard sediments. They usually cannot be filtered by regular means. The polyurethanes of the present invention, although prepared in water, can be deposited as a coating which, when cured, is insensitive to humidity and moisture, which is an unusual combination of properties. Cured coatings prepared with the polyurethane dispersions of the present invention can be made with outstanding elastomeric properties such as high tensile strength, good ultimate elongation, excellent impact resistance and hardness, in addition to excellent solvent and humidity resistance.

SUMMARY OF THE INVENTION

The present invention relates to a non-sedimenting, essentially emulsifier-free aqueous dispersion of an ungelled polyurethane formed by reacting in the presence of water:
A. a partially reacted NCO-containing polymer containing salt groups and highly active hydrogens selected from the group consisting of hydroxyl, thiol, primary and secondary amine, the polymer having a highly active hydrogen equivalent weight of 10,000 or less,
B. an active hydrogen-containing compound having at least one hydrogen more reactive with NCO groups than water to form a polyurethane having an intrinsic viscosity of 2.0 deciliters per gram.

The polyurethanes can be further reacted with a curing agent such as an amine-aldehyde condensate, a phenol-aldehyde condensate, a polyisocyanate or an epoxy-containing material to form a thermoset product.

The highly active hydrogen-containing prepolymers are preferred as they tend to give better curing, pigment dispersion, better gloss, adhesion and application properties, in addition to more stable dispersions and coatings than products prepared by U.S. Pat. No. 3,868,350.

DETAILED DESCRIPTION

The polyurethanes of the present invention are extremely dispersible in aqueous medium, much better than would be expected from the prior art such as U.S. Pat. No. 3,479,310 to Dieterich et al mentioned above. By better dispersibility or improved dispersibility is meant the polyurethanes can be dispersed in water with relatively few acid salt groups and form a finely particulated dispersed phase. Although not intending to be bound by any theory, the reasons we believe the products of the invention have improved dispersibility is first, the NCO-containing prepolymer is of relatively low molecular weight; secondly, by dispersing the low molecular weight NCO-containing prepolymer in water, water competes with the chain extender for reaction with the NCO groups. Although the chain extender is more reactive with the NCO groups than water, water is believed in many instances to react to a minor degree to form urea linkages and salt of carbamic acid. The surprising good dispersibility and product properties are difficult to explain. We believe these reactions can be responsible. Determination that water participates in the reaction can be made by dispersing an NCO-containing prepolymer in a mixture of chain extender and water or in water itself and then adding a chain extender to the dispersion. In either instance, when an equivalent amount of chain extender to NCO prepolymer is used, the amount of chain extender remaining at the completion of the chain extension reaction is an indication of side reactions of the NCO prepolymer with water. The extent of the reaction with water will depend on how much more active the chain extender is with the NCO groups than water, the relative amounts of water and chain extender present in the dispersion and the time the NCO prepolymer is dispersed in water before a chain extender is added.

While it is relatively easy to make gelled products such as disclosed by the aforementioned Witt et al patent, the preparation of non-gelled products is difficult. In the practice of the invention, the NCO-prepolymer reaction is intercepted before completion, for example, at about 25 to 75 percent completion. This avoids gelling as well as forming unstable products. Interception can be accomplished by merely dispersing the partially reacted NCO-containing polymer in a mixture of water and chain extender when the described degree of reaction has been obtained. Such a product will be ungelled and of low molecular weight containing both free isocyanate and highly active hydrogens. The product can be chain extended with mono- and difunctional chain extenders to form a useful ungelled product. Chain extending with trifunctional or higher functionality chain extenders is tricky. Gel formation depends on how far the prepolymer formation reaction has been completed, the average functionality of the reactants used in making the prepolymer, as well as the functionality, amount and type of chain extender, solubilization counter ion used, and methods of each addition. Empirical determination on a laboratory scale should be used to determine the tendency of this highly complex reaction system to gel. The experimental conditions should be carefully followed.

The polyurethane dispersions of the present invention are ungelled and essentially emulsifier free. By the term "ungelled" or "non-gelled" is meant the dispersed resin is substantially free of crosslinking and has an intrinsic viscosity when dissilved in a suitable solvent without depolymerization. The intrinsic viscosity of such a product is an indication of molecular weight. A gelled polyurethane, on the other hand, since it has an essentially infinitely high molecular weight, will have an intrinsic viscosity too high to measure.

The intrinsic viscosity of various resins are determined by art-recognized methods. Thus, the intrinsic viscosity of the resins of the present invention may be determined by first acidifying the resin. The aqueous solvent is removed either by evaporation or decantation. The acidified resin solid is then dissolved in N-methyl pyrrolidone or other suitable solvent at a concentration of from 8 to 30 percent. This solution is further thinned with dimethyl formamide to 0.5 percent and 0.25 percent concentrations. The resins may then be passed through a capillary viscometer to determine the reduced viscosities.

The intrinsic viscosity of the resin will then be determined by the following equation:

$$[\mu] = [\mu \text{ reduced}]_{C=0} = [\mu \text{ reduced}]_{0.25} + [[\mu \text{ reduced}]_{0.25} - [\mu \text{ reduced}]_{0.50}] = 2[\mu \text{ reduced}]_{0.25} - [\mu \text{ reduced}]_{0.50}$$

where $]\mu[$ is intrinsic viscosity and $[\mu \text{ reduced}]_{0.25}$ is the reduced viscosity of 0.25 percent concentration and $[\mu \text{ reduced}]_{0.50}$ is the reduced viscosity of 0.50 percent concentration. The general methods of determining reduced viscosities are described in the art such as *Textbook of Polymer Science*, Billmeyer, Interscience Publishers, New York, 1957, pages 79–81.

The non-gelled polyurethane polymers of the present invention have intrinsic viscosities lower than 4.0 deciliters per gram, and preferably lower than 2.0 deciliters per gram, and most preferably, within the range of 0.1 to 1.5 deciliters per gram; the intrinsic viscosities being determined for anionic polymers on the acid form of the polymer; for non-quaternized cationic polymers on the basic form of the polymer and for quaternized polymers on the inonic form of the polymer itself.

By the term "essentially emulsifier free" is meant that the polyurethane dispersion usually needs no externally added emulsifier or detergent to maintain its stability, although, of course, emulsifiers may be used if desired. When the salt group equivalent weight is high, then a small amount of emulsifier may be used, if desired. Polyurethane dispersions of the present invention are usually very stable in that once they are dispersed, they will not settle or flocculate. They are non-sedimenting and cannot be filtered by conventional techniques.

The organic polyisocyanate which is used in the instant invention can be an aliphatic or an aromatic polyisocyanate or mixture of the two. Aliphatic polyisocyanates are preferred since it has been found that these provide better color stability in the resultant coating. Also, diisocyanates are preferred, although their higher polyisocyanates can be used in place of or in combination with diisocyanates and/or monoisocyanates. As indicated above, the average functionality of the reactants used in making the aqueously dispersed polyurethane is important in controlling the tendency of the polymer to gel. Where higher functionality polyisocyanates are used, some monofunctional isocyanate should be present to reduce the average functionality. Examples of suitable higher polyisocyanates are 1,2,4-benzene triisocyanate and polymerthylene polyphenyl isocyanate. Examples of suitable monoisocyanates are cyclohexyl isocyanate, phenyl isocyanate and toluene isocyanate. Examples of suitable aromatic diisocyanates are 4,4'-diphenylmethane diisocyanate, 1,3-phenylene diisocyanate, 1,4-phenylene diisocyanate and tolylene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and are actually preferred because of color stability and imparting hardness to the product. Examples include 1,4-cyclohexyl diisocyanate, isophorone diisocyanate, alpha, alpha-xylylene diisocyanate and 4,4'-methylene-bis(cyclohexyl isocyanate). This particular polyisocyanate is preferred and is commercially available from E. I. du Pont de Nemours and Company under the trademark HYLENE W®. Substituted organic polyisocyanates can also be used in which the substituents are nitro, chloro, alkoxy and other groups which are not reactive which hydroxyl groups or active hydrogens and provided the substituents are not positioned to render the isocyanate group unreactive. Examples include compounds having the structure:

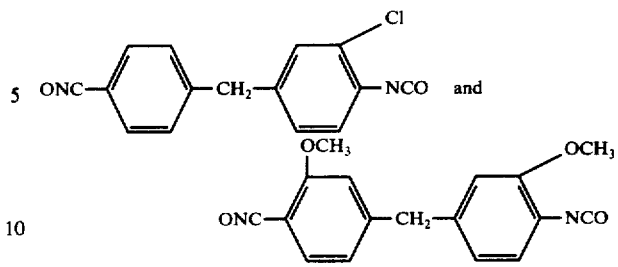

There can also be employed isocyanate-terminated adducts of diols or polyols such as ethylene glycol, 1,4-butylene glycol, polyalkylene glycol and the like. These are formed by reacting more than one equivalent of the diisocyanate, such as those mentioned with one equivalent of diol or polyalcohol to form a diisocyanate product.

Thioisocyanates corresponding to the above-described can be employed as well as mixed containing both an isocyancte and a thioisocyanate group. The terms "polyisocyanate" and "diisocyanate", as used in the present specification and claims, are intended to cover compounds and adducts containing thioisocyanate groups or isocyanate groups and compounds and adducts containing both isocyanate and thioisocyanate groups.

Any suitable organic compound containing highly active hydrogens may be used for reaction with the organic polyisocyanate to form the partially reacted NCO-containing polymers of the present invention. Highly active hydrogens include hydrogen atoms attached to oxygen, nitrogen, or sulfur, and thus useful compounds will include those having at least two of these groups selected from

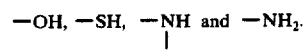

The moieties attached to each group can be aliphatic, aromatic, cycloaliphatic or of a mixed type, not including carbonyl, phosphenyl or sulfonyl linkages.

Examples of such compounds include amines, which includes polyamines, aminoalcohols, mercapto-terminated derivatives, and alcohols, which includes polyhydroxy materials (polyols) which are preferred because of the ease of reaction they exhibit with polyisocyanates. Alcohols and amines generally give no side reactions, giving higher yields of urethane (or urea) product with no by-product and the products are hydrolytically stable. Also, with regard to polyols, there are a wide variety of materials available which can be selected to give a wide spectrum of desired properties. In addition, the polyols have desirable reaction rates with polyisocyanates. Both saturated and unsaturated active hydrogen-containing compounds can be used, but saturated materials are preferred because of superior coating properties.

The amines which can be employed in the preparation of the urethanes of the invention can be primary or secondary diamines or polyamines in which the radicals attached to the nitrogen atoms can be saturated or unsaturated, aliphatic, alicyclic, aromatic, aromatic-substituted aliphatic, aliphatic-substituted aromatic or heterocyclic. Mixed amines in which the radicals are different such as, for example, aromatic and aliphatic can be employed and other non-reactive groups can be present attached to the carbon atoms, such as oxygen, sulfur, halogen or nitroso. Exemplary of suitable aliphatic and alicyclic diamines are the following: 1,2-ethylene diamine, 1,2-propylene diamine, 1,8-menthane diamine, isophorone diamine, propane-2,2-cyclohexyl amine and methane-bis-(4-cyclohexyl amine), and

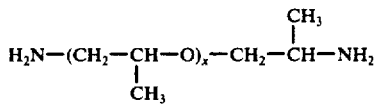

where $x = 1$ to $10$.

Aromatic diamines such as the phenylene diamines and the toluene diamines can be employed. Exemplary of the aforesaid amines are: o-phenylene diamine and p-tolylene diamine. N-alkyl and N-aryl derivatives of the above amines can be employed such as, for example, N,N'-dimethyl-o-phenylene diamine, N,N'-di-p-tolyl-m-phenylene diamine, and p-amino-diphenylamine.

Polynuclear aromatic diamines can be employed in which the aromatic rings are attached by means of a valence bond such as, for example, 4,4'-biphenyl diamine, methylene dianiline and monochloromethylene dianiline.

The use of amines dissolved in ketones is sometimes desirable because of better control over reaction conditions.

Besides the amines mentioned above, hydrazines and hydrazides such as are described later in the specification can also be employed.

Aminoalcohols, mercapto-terminated derivatives and mixtures, and the like, hydroxy acids and amino acids can also be employed as the active hydrogen compounds. Examples are: monoethanolamine, 4-aminobenzoic acid, aminopropionic acid, N-(hydroxyethyl-)ethylene diamine, 4-hydroxybenzoic acid, p-aminophenol, dimethylol propionic acid, hydroxy stearic acid, and beta-hydroxypropionic acid. When amino acids are used, additional basic material should also be present to release NCO-reactive amines from Zwitter-ion complexes.

To digress for a moment, the active hydrogen-containing compound can, if desired, contain functional moieties which are capable of further reaction to cure the product. Examples would be active hydrogen-containing compounds which contained acrylic unsaturation which would enable the coating to be cured by ultraviolet light with vinyl monomers. Various curing mechanisms will be described in more detail later.

The polyhydroxyl materials or polyols can be either low or high molecular weight materials and in general will have average hydroxyl values as determined by ASTM designation E-222-67, Method B, between about 1000 and 10, and preferably between about 500 and 50. The term "polyol" is meant to include materials having an average of two or more hydroxyl groups per molecule.

The polyols include low molecular weight diols, triols and higher alcohols, low molecular weight amide-containing polyols and higher polymeric polyols such as polyester polyols, polyether polyols and hydroxy-containing acrylic interpolymers.

The low molecular weight diols, triols and higher alcohols useful in the instant invention are known in the art. They have hydroxy values of 200 or above, usually within the range of 1500 of 200. Such materials include aliphatic polyols, particularly alkylene polyols containing from 2 to 18 carbon atoms. Examples include ethylene glycol, 1,4-butanediol, 1,6-hexanediol; cycloaliphatic polyols such as 1,2-cyclohexanediol and cyclohexane dimethanol. Examples of triols and higher alcohols include trimethylol propane, glycerol and pentaerythritol. Also useful are polyols containing either linkages such as diethylene glycol and triethylene glycol and oxyalkylated glycerol.

Also useful are low molecular weight amide-containing polyols having hydroxyl values of 100 or above. These materials are described in U.S. Patent application Ser. No. 405,713, filed Oct. 11, 1973, to Chang and assigned to PPG Industries, Inc., the assignee of the present invention, on page 8, line 19, to page 12, line 23, the portions of which are hereby incorporated by reference. When these low molecular weight amide-containing polyols are incorporated into the polymer, they enhance its water dispersibility.

Where flexible and elastomeric properties are desired, the partially reacted NCO-containing polymer should preferably contain at least a portion of a higher molecular weight polymeric polyol. Such a polymeric polyol should be predominantly linear (that is, absence of trifunctional or higher functionality ingredients) to avoid gelling of the resultant polymeric product and should have a hydroxy value of 200 or less, preferably within the range of about 150 to 30.

The most suitable polymeric polyols include polyalkylene ether polyols including thio ethers, polyester polyols including polyhydroxy polyesteramides and hydroxyl-containing polycaprolactones and hydroxy-containing acrylic interpolymers.

Any suitable polyalkylene ether polyol may be used including those which have the following structural formula:

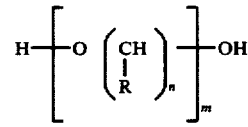

where the substituent R is hydrogen or lower alkyl including mixed substituents, and $n$ is typically from 2 to 6 and $m$ is from 2 to 100 or even higher. Included are poly(oxytetramethylene) glycols, poly(oxyethylene) glycols, polypropylene glycols and the reaction product of ethylene glycol with a mixture of propylene oxide and ethylene oxide.

Also useful are polyether polyols formed from the oxyalkylation of various polyols, for example, glycols such as ethylene glycol, 1,6-hexanediol, Bisphenol A, and the like, or higher polyols, such as trimethylol propane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide, in the presence of an acidic or basic catalyst.

Besides poly(oxyalkylene) glycols, any suitable polyhydric polythioether may be used such as, for example, the condensation product of thioglycol or the reaction product of a polyhdric alcohol, such as disclosed herein for the preparation of hydroxyl polyesters, with thioglycol or any other suitable glycol.

Polyester polyols can also be used as a polymeric polyol component in the practice of the invention. The polyester polyols can be prepared by the polyesterification of organic polycarboxylic acids or anhydrides thereof with organic polyols. Usually, the polycarboxylic acids and polyols are aliphatic or aromatic dibasic acids and diols.

The diols which are usually employed in making the polyester include alkylene glycols, such as ethylene glycol and butylene glycol, neopentyl glycol and other glycols such as hydrogenated Bisphenol A, cyclohexane diol, cyclohexane dimethanol, caprolactone diol (for example, the reaction product of caprolactone and ethylene glycol), hydroxy-alkylated bisphenols, polyester glycols, for example, poly(oxytetramethylene) glycol and the like. However, other diols of various types and, as indicated, polyols of higher functionality can also be utilized. Such higher polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

As has been mentioned above, some monofunctional alcohol such as n-propyl alcohol and n-butyl alcohol can be used.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. The polyester may include minor amounts of monobasic acid, such as benzoic acid, stearic acid, acetic acid, hydroxy stearic acid and oleic acid. In an interesting embodiment we have found that larger amounts of a monobasic acid such as benzoic acid can be combined with sucrose to make effectively difunctional sucrose pentabenzoate. This difunctional material can then be reacted with various other ingredients and isocyanates to form polyurethanes having enhanced durability. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutarate can be used. It is preferred that the polyester include an aliphatic dicarboxylic acid as at least part of the acid component.

Besides polyester polyols formed from polybasic acids and polyols, polycaprolactone-type polyesters can also be employed. These products are formed from the reaction of a cyclic lactone such as epsilon-caprolactone with a polyol or a hydroxy acid. Such products are described in U.S. Pat. No. 3,169,949 to Hostettler, the portion of this patent relating to the description of polycaprolactone polyols being incorporated by reference. Although not disclosed in the aforementioned patent, the product of cyclic lactone with an acid-containing polyol can be used. The reaction of urea and caprolactone such as described in U.S. Pat. No. 3,832,333 to Chang et al can also be used.

While polyester polyols have been specifically disclosed, it is to be understood that useful products are also obtainable by substituting a polyesteramide polyol, or a mixture of polyesteramide polyols for part or all of the polyester polyol. The polyesteramide polyols are produced by conventional techniques from the above-described acids and diols, and minor proportions of diamines or aminoalcohols. Suitable diamines and aminoalcohols includes hexamethylene diamine, hydrazine, bis(4-aminocyclohexyl) methane, diethylene triamine, ethylene diamine, ethanolamine, phenylene diamine, toluene diamine and poly(amide-amines) such as the VERSAMIDS® sold by General Mills, and the like. It is to be understood that the polyester polyols of the instant invention include such polyesteramide polyols.

In addition to the higher molecular weight polyether and polyester polyols, hydroxy-containing acrylic interpolyers can also be employed. These products are described in U.S. Patent application Ser. No. 392,585, filed on Aug. 29, 1973, to Chang et al and assigned to PPG Industries, Inc., the assignee of the present invention, on pages 5 and 6, the portions of which are hereby incorporated by reference.

The higher polymeric polyol component is preferably combined with the low molecular weight polyol described above. It has been found that by blending high and low molecular weight polyols, optimum properties can be obtained in the resultant NCO-containing prepolymer. Preferably, the polymeric polyol is the major component, being present in an amount of about 25 to 95 percent by weight based on total weight of the polyol used to prepare the NCO-containing prepolymer, the remainder being low molecular weight polyol. As has been mentioned above, the overall OH functionality per unit weight of polyol used in preparing the prepolymer is important in attaining a resinous and not a gelled product.

In order to make oxidative, curable materials and coatings with hydrophobic properties, drying oils or semi-drying oils can be incorporated into the prepolymer. By drying oil or semi-drying oil is meant the hydroxyl-containing reaction products of fatty acids and polyols. Other modifying acids such as unsaturated and aromatic acids can also be used. The fatty acids are characterized by containing at least a portion of unsaturated fatty acids. The hydroxyl-containing material is often prepared by reacting a triglyceride, for example, safflower oil, with pentaerythritol so that an exchange reaction takes place between the two compounds. Another method of preparation is to partially esterify a polyol with an unsaturated fatty acid. Generally, drying oils are those oils which have iodine values of about 130 or higher, and the semi-drying oils are those which have an iodine value of about 90 to 130 as determined by method ASTM D-1467. Examples of such oils include linseed oil, soya oil, perilla oil, tung oil, oiticica oil, poppyseed oil, sunflower oil, tall oil esters, walnut oil, dehydrated castor oil, herring oil, menhaden oil, sardine oil, and the like.

When oils are incorporated into the polymer, higher amounts of water-solubilizing groups which are described in more detail later may be necessary to achieve satisfactory dispersion.

As mentioned above, the average functionality of the reactants used in making the aqueously dispersed polyurethanes is important in controlling gelling. Where higher functionality active hydrogen-containing materials such as trifunctional and higher functionality materials are used, the use of some monofunctional active hydrogen-containing compound is preferred.

The partially reacted NCO-containing polymer also contains salt groups which may be anionic or cationic groups. Anionic groups can be selected from the class consisting of —OSO$_3^-$, —OPO$_3^=$, COO−, SO$_2$O−, POO− and PO$_3^=$. The NCO-polymer can be prepared with reactants containing the acid salt group or, as is more normally the case, can be prepared with free acid groups which can be subsequently neutralized after polymer formation. Suitable materials for introducing acid groups into the partially reacted NCO-containing polymer are materials which contain at least one active hydrogen atom reactive with isocyanate groups or at least one isocyanate group, and at least one group capable of salt formation. Preferably, the acid group is in the active hydrogen material because isocyanates containing acid groups are not stable.

Specific examples of compounds which contain active hydrogens and acid groups capable of salt formation are hydroxy and mercapto carboxylic acids. Examples include dimethylol propionic acid, glycollic acid, thioglycollic acid, lactic acid, malic acid, dihydroxy malic acid, tartaric acid, dihydroxy tartaric acid, and 2,6-dihydroxy benzoic acid, diglycollic acid and thiodiglycollic acid. Other examples of compounds which contain active hydrogens and acid groups are aminocarboxylic acids, aminohydroxy carboxylic acids, sulfonic acids, hydroxy sulfonic acids and aminosulfonic acids. Examples include oxaluric acid, anilido acetic acid, glycine, alpha,-alanine,6-amino caproic acid, product of ethanolamine and acrylic acid, hydroxy ethyl propionic acid, 2-hydroxy ethane sulfonic acid and sulphanilic acid. As mentioned above, the amino acids must be used in the presence of a base such as KOH or a tertiary amine. Other examples include bis-hydroxymethylphosphinic acid, trimethylol propane monophosphate and monosulfate, hydroxyethyl aminomethylphosphonic acid.

Suitable salt forming agents for acid group-containing compounds include inorganic and organic bases such as sodium hydroxide, potassium hydroxide, ammonia and tertiary amines.

Besides acid salt groups which are anionic, the partially reacted NCO-containing polymer can contain cationic salt groups which can be selected from the class consisting of

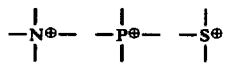

and mixed groups. The prepolymer can be prepared with reactants containing the cationic salt groups, or as is more normally the case, prepolymers containing suitable precursors can be converted to the cationic salt by adding a quaternizing or neutralizing agent to the prepolymer. Suitable materials for introducing cationic groups into the partially reacted NCO-containing prepolymer are materials which contain at least one active hydrogen atom reacted with isocyanate groups, or at least one isocyanate group and at least one group capable of cationic salt formation.

Examples of classes of materials which can be used are the following: compounds which have acid neutralized primary or secondary amino groups, basic tertiary amino groups, tertiary phosphine groups which can be neutralized with acid or quaternized with quaternizing agent; compounds which contain halogen atoms capable of quaternizing reactions; compounds which contain epoxy groups which are reactive with amines and phosphines to form acid salts or quaternary groups, and which are reacted with sulfides to form acid salts or ternary sulfonium groups.

Specific examples of compounds which have active hydrogens and basic tertiary amino groups are aliphatic, cycloaliphatic, aromatic and heterocyclic amino alcohols, diols and triols. Examples include N,N-dimethylethanolamine, N-methyl-N-(beta-hydroxyethyl)-aniline, N-hydroxyethylpiperidine, methyl diethanolamine, cyclohexyl diethanolamine, N,N-(bishydroxyethyl)aniline, N,N-bis(hydroxethyl)-alpha-aminopyridine. Other specific examples are amines, diamines, triamines and amides such as N,N-dimethyl hydrazine, N,N-dimethyl ethylenediamine, alpha-aminopyridine, N-aminopropylethylene imine and bis(3-aminopropyl)-methylamine. The above materials can be converted into cationic salt groups with inorganic and organic acids such as hydrochloric acid, phosphoric acid, acetic acid, glycollic acid, and lactic acid. Another way to convert into cationic groups is by using alkylating agents such as (CH$_3$O)$_2$SO$_2$, CH$_3$I and C$_2$H$_5$Br.

Specific examples of compounds which contain active hydrogen and halogen atoms capable of quaternizing reactions are 2-chloroethanol and 3-bromopropanol.

Examples of compounds which contain isocyanates and halogens capable of quaternizing reactions are chlorohexyl isocyanate, N-(4-methyl-3-isocyanato-phenyl)-o-beta-bromoethylcarbamate.

The compounds described immediately above containing halogen atoms capable of quaternizing reactions may be quaternized with tertiary amines and phosphines or ternated with sulfides. Quaternary ammonium and phosphonium or ternary sulfonium salts are then formed. The following are specific examples: trimethylamine, pyridine, triethanolamine, dimethylsulfide, thioglycol, thioglycollic acid and trialkyl phosphines.

Specific examples of active hydrogen-containing compounds which contain epoxy groups which are reactive with amines and phosphines to form tertiary acid salts and quaternary groups, and which are also reactive with sulfides to form ternary sulfonium groups are hydroxy-containing mono- or diepoxides such as

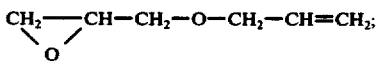

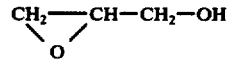

and

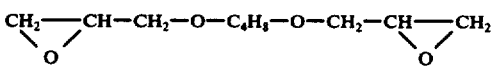

The reaction of epoxy-containing materials with tertiary amines to form quaternary ammonium groups is described in U.S. Pat. No. 2,676,166 to Webers; the reaction of epoxy materials with tertiary phosphines is described in U.S. Pat. No. 3,429,839 to Franco and the reaction of epoxy compounds with sulfides to form ternary sulfonium groups is described in U.S. Pat. No. 3,793,278 to DeBona.

Besides using ionic solubilizing groups as described above, non-ionic solubilizing groups can also be incorporated into the polymer. Non-ionic groups remain in the polymer structure even after coating has been applied, and introduce hydrophilicity into the coating which severely detracts from the moisture resistance of the coating. Ionic groups, on the other hand, such as amine salts of carboxylic acids can be decomposed after the coating has been applied such as by baking and are therefore not present to affect the hydrophilicity of the resultant coating. Also, ionic groups, particularly anionic groups which are preferred, are more effective in dispersing the prepolymer.

As with the ionic solubilizing groups, non-ionic solubilizing groups can be incorporated into the prepolymer through the isocyanate or through the active hydrogen component of the prepolymer. Examples of non-ionic water solubilizing groups are ethylene oxide moieties which should constitute not more than 50 percent by weight of the prepolymer and which can be incorporated into the prepolymer using polyethylene glycols or NCO-terminated urethane modified polyethylene glycols. Other examples of water-solubilizing groups are amide or urea group-containing polyols such as are described above.

The partially reacted NCO-containing polymer may contain both anionic and cationic groups. Preferably, the anionic groups will predominate. Both anionic and cationic groups may be introduced into the polymer chain by using reactants which have both anionic and cationic groups (Zwitterions). Examples of such reactants would be hydroxy-containing ethylene diamine, derivatives of acetic acid such as

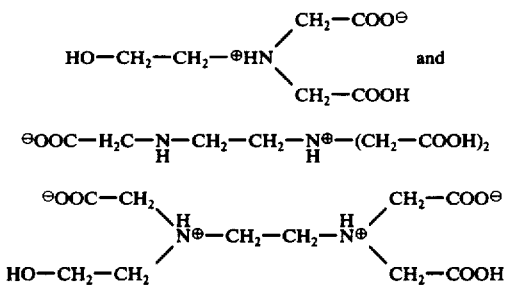

Also, aromatic Zwitterions such as

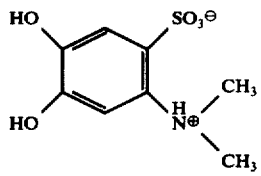

could be employed. One advantage of having both anionic and cationic groups in the polymer molecule is that they can cooperate with one another to form a chleating resin for complexing metal ions. As mentioned above, the anionic group should predominate and this can be achieved by selection of the appropriate reactants and controlling the pH of the dispersion. By predominate is meant that the anionic groups constitute at least 60 mole percent of the ionic groups.

The partially reacted NCO-containing polymer can be prepared by techniques well known in the art. For example, the polyisocyanate is usually first charged to a suitable reaction vessel, followed by the active hydrogen component, and the mixture may then be heated if necessary util isocyanate has reacted with the active hydrogens to the desired extent to produce a partially-reacted NCO-containing polymer which contains highly active hydrogens, i.e., hydrogens selected from the group of hydroxyl, thio, primary and secondary amine. The highly active hydrogen equivalent weight is defined as the weight of the partially reacted NCO polymer per reactive active hydrogen and should be 10,000 or less, usually between 150 to 8,000. The active hydrogen equivalent weight can be determined by first determining an NCO equivalent on the partially reacted product; reacting further until an essentially constant NCO equivalent is obtained indicating complete reaction. The difference between the two is an indication of the highly active hydrogens and can be used to calculate the highly active hydrogen equivalent weight. If on further reaction the product gels before obtaining an essentially constant equivalent weight, then a known amount of monoisocyanate should be used to avoid gelling, the NCO equivalent corrected for the additional isocyanate and the highly active equivalent weight calculated as described above. If desired, catalyst such as dibutyltin dilaurate, stannous octoate and the like can be employed to accelerate the reaction. Reaction can take from several minutes to several days, depending on the desired degree of reaction, the reactivity of the reactants, temperature, presence or absence of catalyst, and the like.

Usually a solvent is employed to facilitate reaction and control of the viscosity of the prepolymer. The viscosity of the prepolymer is extremely important in obtaining a stable dispersion with a finely particulated dispersed phase. The viscosity of the prepolymer can be reduced by heating the neat polymer melt or by dissolving the polymer in a suitable solvent. Dissolution of the polymer in organic solvent is preferred because it is an easier way to control polymer viscosity.

Suitable solvents for the prepolymer are those which are unreactive towards NCO groups. Such solvents are organic solvents such as ketones, tertiary alcohols, ethers, esters, hydrocarbons and chlorocarbons. Suitable solvents for the final polymer product which are reactive towards NCO groups may be added right before the prepolymer is dispersed, during dispersion or after dispersion. The solvents for the final polymer product should be water-soluble if they are added after dispersion, and examples include ketones and alcohols. Water-insoluble materials such as chlorocarbons or hydrocarbons should not be added to the resin after it is dispersed.

For air drying systems, or the low temperature bake systems, a high boiling solvent, that is, one which boils above 125° C., is preferably used at least in part to provide film coalescence, although low boiling solvents, that is, those boiling below 100° C., may be used with such systems for processing advantages such as rapid drying. With high temperature baking systems, the temperature itself is sufficient to provide film coalescence and high boiling solvents are often not necessary, although, of course, they can be used along with low boiling solvents for processing advantages such as stabilizing the dispersion.

When a solvent is employed, it should be present in an amount sufficient to reduce the viscosity of the prepolymer to the required level, at a moderate temperature, i.e., up to 150° C., to effect adequate dispersion, and yet preferably not be present in an amount so great that subsequent removal of the solvent would be needed. Generally, the solvent should be used in an amount of up to 60 percent, and preferably about 3 to 40 percent by weight, based on total weight of the solvent and NCO-containing prepolymer.

The organic polyisocyanate is employed in an amount sufficient to react with the desired amount of the active hydrogen-containing components so as to produce an NCO-containing prepolymer. The equivalent ratio of organic polyisocyanate to active hydrogen-containing compound is usually within the range of about 7 to 0.5:1, preferably within the range of 6 to 0.7:1.

The ratio of active hydrogen compounds to one another will vary, depending upon the nature of the solubilizing groups and the properties desired in the final coating.

For elastomeric coatings, a high molecular weight polyester or a polyether polyol should be present in the prepolymer formulation and constitute at least 20 percent by weight of the prepolymer based on total weight of the prepolymer reactants. Preferably, about 25 to 80 percent by weight of the polymeric polyol should be employed in order to get optimum elastomeric properties.

To obtain somewhat harder elastomeric coatings, the prepolymer formulation can be varied by the incorporation of a low molecular weight active hydrogen-containing compound such as a polyol into the formulation. In general, the low molecular weight, active hydrogen-containing compound will be present in amounts up to 50 percent by weight, preferably about 2 to 35 percent by weight based on total weight of the NCO-polymer reactants. When the low molecular weight active hydrogen-containing compound is needed for water solubility, such as is the case with prepolymers containing non-ionic water solubilizing groups, low molecular weight, active hydrogen-containing compounds should be employed, that is, from about 2 to 35 percent by weight based on total weight of the NCO-polymer reactants.

In the case where drying or semi-drying oil is incorporated into the composition, the amount used will depend once again on many factors such as the degree of flexibility desired in the final coating and the nature of the other reactants, as well as the degree and rate of air curing. In general, the drying oil should be used in amounts up to 50 percent by weight, usually about 5 to 40 percent by weight based on total weight of the NCO-polymer reactants where an air drying coating composition is desired. We have found that because of their hydrophobicity, oil-containing polyurethanes may sometimes require a somewhat higher percentage of acid salt groups than comparable polyurethanes free of such oils.

The amount of salt groups contained in the polymer depend on the product desired, the amount of other solubilizing groups present, the molecular weight of the product, as well as the hydrophobic groups present.

The percentage of salt groups in the prepolymer can be expressed as the salt group equivalent weight which is defined as the weight of the partially reacted NCO-polymer per acid salt group and which can be determined by dividing the weight of the NCO-polymer in grams by the number of acid salt groups present in the prepolymer. The salt group equivalent weight of the prepolymer should broadly be within the range of 150 to 20,000, preferably 200 to 6,000, in order to form stable dispersions. High proportions of salt groups or lower salt equivalent weights than that specified in the above-mentioned range are not recommended because the resulting polymers are too soluble, forming viscous, hard-to-handle dispersions or solutions. Lower proportions of salt groups or higher salt equivalent weights than that specified in the above-mentioned broad range are also not recommended because the resultant prepolymer will have poor water dilutability. Such prepolymers form coarse, sedimenting dispersions which cannot easily be used to form smooth uniform coating compositions.

The salt equivalent weight can be controlled by controlling the amount of salt-forming groups which are incorporated into the polymer and/or controlling the degree of salt formation of the polymer which contains salt-forming groups. Either method of controlling the salt equivalent weight has been found to be satisfactory.

It should be mentioned at this point the importance in salt formation of controlling the valency of the counter ion formed. The counter ion is the ionic group not covalently bound to the polymer which results from the formation of ionic groups in the NCO-containing polymer. For example, when a sulfonic acid-containing prepolymer is neutralized with a diamine, a diamine counter ion results. Since the counter ion is a divalent, it can crosslink polymer chains resulting in gelling of the resin, provided, of course, the pH of the dispersion is suitable. Therefore, salt formers having essentially monovalent counter ions should be employed. A monovalent counter ion for the purposes of this invention is one which exhibits a valency of one towards the polymer in the dispersion. Such counter ions can be actually monovalent species such as monoamine cation. Under certain circumstances, potentially polyvalent counter ions can also be monovalent towards the polymer in aqueous dispersion. Examples of potentially polyvalent counter ions which behave as monovalent counter ions towards the polymer are materials such as ethylene diamine which has the potential of being a divalent counter ion because of the two amine groups. However, when it is used to neutralize a carboxylic acid-containing prepolymer, it is protonated itself which affects the $pK_a$ of the second amine group, making it more difficult to protonate and requiring a stronger acid than the carboxylic acid groups of the polymer. Thus, ethylene diamine behaves as a monovalent counter ion to the carboxylic acid-containing prepolymer. As mentioned above, with sulfonic acid-containing prepolymers, ethylene diamine would usually behave as a divalent counter ion. Another example of where a normally polyvalent counter ion could be made to behave as a monovalent counter ion is by controlling the pH of the dispersion or by using a large excess of counter ion.

The salt can be incorporated into the prepolymer in the course of the NCO polymer production or at any other suitable time either with or without the presence of solvents. Alternately, salt formation can take place at the time of dispersing the prepolymer in the aqueous medium. With regard to salt forming before dispersion, the salt former such as a tertiary amine can be added to a carboxylic acid-containing neat NCO prepolymer to form the prepolymer salt. However, it is preferred a solvent be employed (i.e., 5 to 60 percent by weight), because adding the salt former to the neat polymer may adversely affect the viscosity of the polymer. Alternately, the salt can be first formed and then reacted to form the prepolymer. An example would be where the amine salt of dimethylol propionic acid was first prepared and then reacted with a polyisocyanate to form NCO-containing prepolymer. However, as has been mentioned above, it is preferred that the salt formation take place upon dispersion of the prepolymer. In some cases, by delaying neutralization or salt formation until the dispersion stage, one is better able to control the viscosity of the prepolymer and thus better able to obtain a finely dispersed, stable dispersion.

To form a finely divided, stable dispersion, the NCO-containing prepolymer should be within the viscosity range of 50 to 10,000, and preferably from 100 to 5,000 centipoises. Polymers within this viscosity range are easy to disperse, requiring only mild agitation. Polymers with viscosities higher than 10,000 centipoises are difficult to disperse even with high shear agitation equipment because large or very coarse dispersions are formed which are usually coarse and sedimenting.

The amount of aqueous medium employed in the formulations of the dispersions of the present invention is important. When too little amount of aqueous medium is employed, mixtures are obtained which are often too thick to handle easily while, on the other hand, dispersions which are too dilute are uneconomical to handle due to their excessive volume. In general, the aqueous medium will amount to 15 to 80 percent by weight, preferably about 20 to 70 percent by weight, based on total weight of the polymer and the aqueous medium. Water is a necessary ingredient of the aqueous medium, being present in an amount of at least 30 and preferably at least 45 percent by weight based on total weight of the aqueous medium with a cosolvent constituting the remainder of the medium.

The term "dispersion" as used within the context of the present invention, is believed to be a two-phase, translucent, aqueous polyurethane system in which the polyurethane is the dispersed or continuous phases. In most instances, the polyurethane is dispersed and when thinned with water to form a one percent solids dispersion, the average particle size diameter is less than 10 and preferably less than 5, and most preferably 1 micron or less as determined by light transmission. The particles may be spherical or elongated or invisible by microscopic investigation. The dispersions are generally only stable if the particle size does not exceed 5 microns. Small particle size dispersions are advantageous because they are non-sedimenting and have a high surface energy associated with them. This results in a strong driving force for coalescing and in coatings having surprisingly fast drying times. However, dispersions having particle sizes greater than 5 microns can also be prepared. Although these larger particle size dispersions will settle out, they can be filtered to produce solvent-free fusible materials. The term "dispersion" is also intended to cover homogeneous aqueous solutions which appear optically clear.

It should be pointed out at this point in the specification that where the term "polyurethane" has been used in the specification and claims, it is intended to cover not only polycondensates of polyisocyanates and polyols, but also the condensates of polyisocyanates with any active hydrogen-containing material mentioned above. Thus, the term "polyurethane" is defined as any polymer containing two or more urethane groups and is also intended to cover polyureas as well as polythiourethanes.

The partially reacted NCO-containing polymer can be dispersed in a number of ways. Preferably, the prepolymer, whether neat or as a solution, is added incrementally to the aqueous dispersing medium with agitation. Alternately, the aqueous dispersing medium can be added incrementally to the prepolymer with stirring. However, this latter method is less preferred because commonly upon initial addition of the dispersing medium, a high viscosity, grease-like material results. The main disadvantage associated with this grease-like viscosity is that it is very hard to stir in more water. Without efficient stirring, there is a definite possibility of forming gel particles. By adding the prepolymer to water, this high initial viscosity is avoided.

After the partially reacted polymer has been prepared, additional solvent can be added before dispersion or, for that matter, after the prepolymer has been dispersed in the aqueous mddium so as to control the viscosity of the prepolymer and particle size of the dispersed phase or enhance film coalescence and overall coating properties. The solvents can be selected from those mentioned above. Use of low molecular weight hydrophilic solvents such as lower alkyl alcohols (stearically hindered so as not to react with NCO) will sometimes increase the viscosity of the final polymer product acting as a thickening agent. The use of hydrophobic solvents such as toluene, benzene and xylene will give coarser dispersions. A hydrophilic solvent can be added to the prepolymer at any time in the process, although the effect it renders on the viscosity may be different. A hydrophobic solvent should be added to the prepolymer before dispersion, otherwise a two-layered product forms.

As has been mentioned above, because of viscosity and dispersion stability considerations, it is preferred that the partially reacted NCO-containing polymer be added to the aqueous medium which contains a salt former.

Usually after the salt form of the NCO-polymer has been dispersed, a chain extender is added to the dispersion fairly quickly. The prepolymer reacts with water at a slow rate depending upon the reaction mixture. The time after the prepolymer has been added to water and before chain extender is added will determine how much of the water reacts with the prepolymer. The temperature of the dispersion will also play an effect in how much reaction occurs. Change in temperature and time will result in different products. In order to get reproducible results, the time, temperature and amount of chain extender should be rigidly controlled. The time and temperature is important to determine what type of final product is desired. Chain extenders build molecular weight of the dispersed prepolymer, whereas chain terminators react with the NCO groups and prevent them from further reacting with water and gelling the resultant resin. For purposes of this invention, the term "chain extender" is meant to cover both chain extenders which build molecular weight and also chain terminators. The chain extender can be defined as an active hydrogen-containing compound having at least one hydrogen more reactive with NCO groups than water. Examples of suitable classes of chain extenders are ammonia, primary and secondary organic amines, preferably diamines, hydrazine, substituted hydrazines, and hydrazine reaction products and certain organic polyols. The chain extenders are preferably water-soluble, although water-dispersible materials may be used. Water-soluble chain extenders are preferred, because if the prepolymer is only marginally dispersible, a water-soluble chain extender will enhance the water dispersibility of the final polymer product. Organic diamines are often the preferred chain extenders because they usually build the highest molecular weight without gelling the resin, provided, of course, the ratio of amino groups to isocyanate groups must be properly controlled. The amount of chain extender depends on its functionality, on the NCO content of the prepolymer and on the extent of reaction. The ratio of active hydrogen groups in the chain extender to NCO groups in the prepolymer should be within the range of about 0.2 to 3:1, preferably from 0.50 to 2:1, in order to obtain solvent-soluble non-gelled products.

Special note should be made of chain extenders which also introduce functional groups into the final polymer structure so as to make the final polymer further reactive with materials such as curing agents or the like. Examples of such chain extenders would be alkanol amines such as N-aminoethylethanolamine, ethanolamine, diethanolamine, aminopropyl alcohol, 2,2-dimethyl-3-ol-propenylamine, 3-aminocyclohexyl alcohol, para-aminobenzyl alcohol and the like. Materials of this type introduce hydroxyl functionality into the final polymer product. Examples of other materials which would introduce functionality into the final polymer product would be carboxylic acid-containing amines such as lysine or lysine hydrochloride glutamic acid, glycine, alanine, reaction product of ethylene diamine and acrylic acid which would introduce carboxyl functionality into the final polymer product. Use of carboxyl-containing chain extenders can also be used in instances where acid salt-containing prepolymer is only marginally dispersible. In this instance, the carboxyl-containing amine chain extender could be neutralized and when used to chain extend the prepolymer, would enhance the dispersibility of the final polymer product.

Examples of suitable chain extenders other than those mentioned specifically above are the following: ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diaminopyridine, 4,4'-diamino diphenylmethane, and adducts of diethylene triamine with acrylate or its hydrolyzed products. Also materials such as hydrazine, substituted hydrazines such as, for example, dimethyl hydrazine, 1,6-hexamethylene-bis-hydrazine, carbodihydrazide, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omege-amino-caproic acid hydrazide, hydrazides made by reacting lactones with hydrazine such as gamma-hydroxybutyric hydrazide, bis-semi-carbazide, bis-hydrazide carbonic esters of glycols such as any of the glycols mentioned above.

When the polyurethane is in the dispersed phase, the final chain extended polymer dispersed in water should have a viscosity of about 10 to 50,000, and preferably from about 20 to 20,000 centipoises at 50° C. or less in order to be easily handled and should have a solids content of about 20 to 80 percent. As mentioned earlier, dispersion should be stable and can be essentially emulsifier free. The particle size of the dispersed phase is less than 5 and preferably less than 1 micron, and the particles may be spherical or elongated. Further, the dispersed, chain extended resin should be non-gelled, having an intrinsic viscosity of less than 4.0, preferably less than 2.0 and most preferably from about 0.1 to 1.5 deciliters per gram; the intrinsic viscosity being determined on the acid form of the prepolymer rather than the acid salt.

Crosslinking or curing agents may be added to the dispersion, these agents bringing about chemical crosslinking after a film is deposited either at room temperature or elevated temperature, depending upon the coating system. The crosslinking agent can be used with both low molecular weight and high molecular weight products to produce better products. Examples of suitable curing agents would be aminoplast resins, formaldehyde, phenolic resins, alkoxysilanes, organic polyisocyanates which include free, as well as masked and blocked isocyanates, and epoxy-containing organic materials. Water-soluble crosslinking agents such as the aminoplast, formaldehyde and phenolics are simply added to the finished dispersion, whereas more hydrophobic materials such as some organic isocyanates and some epoxy-containing organic materials are preferably dissolved or emulsified in a solvent which is compatible with water. They should be compatible with the aqueous polyurethane without separating into two layers when mixed.

The aminoplast, phenol-formaldehyde and isocyanate curing agents are employed to cure products containing free hydroxyl or amine groups. Suitable aminoplast, phenolic and isocyanate curing agents are described in U.S. Patent application Ser. No. 392,585 to Chang et al, page 9, line 19, to page 11, line 11, which is hereby incorporated by reference.

Examples of other curing agents are organic epoxy materials. The epoxies can be used as curing agents to cure products containing free amino groups or carboxylic acid groups. Epoxy compounds can be any monomeric or polymeric compound or mixture of compounds having a 1,2-epoxy equivalency greater than 1, that is, in which the average number of 1,2-epoxy groups per molecule is greater than 1. Useful class of polyepoxides is polyglycidyl ethers of polyphenols such as Bisphenol A, or polyols such as butanediol.

The curing agents described above are examples of external curing agents which form one component of a two-component system with the chain extended polymer forming the other component. These two-component systems come in the form of one or two-package systems depending on the reactivity of the curing agent at room temperature. For example, aminoplast curing agents which are usually unreactive at room temperature may be blended with the polyurethane dispersion of the invention to form stable one-package systems. On the other hand, some epoxy curing agents and all free NCO-type curing agents, because of their high reactivity at room temperature, must be used with the polyurethane dispersions of the invention in a two-package system.

Besides two-component systems, a one-component system in which the curing agent is part of the chain extended polymer can also be employed. Internal curing agents can be incorporated into the polymer molecule either in the prepolymer preparation or chain extension stages by the use of active hydrogen-containing materials which also contain groups capable of curing the resin. Usually these groups are latent curing agents and are activated by heat, UV light, electron beam radiation, microwave radiation and the like. Coatings prepared from the aqueous dispersions of the present invention are particularly suited for microwave radiation curing, since both water and the polar nature of the polymer increase the efficiency in absorbing the incident radiation. This has proven especially effective in curing these coatings with a non-absorbing transparent substrate such as when the coatings are applied on glass bottles.

Examples of other systems capable of internal curing would be chain extended polyurethanes of the present invention containing N-alkoxymethyl moieties or blocked isocyanate moieties. Examples of such products would be chain extended polyurethanes of the present invention prepared with hydroxy-containing acrylic polymers made in part from N-alkoxymethyl acrylamides and/or ethylenically unsaturated blocked isocyanates. Such interpolymers are described in the aforementioned Chang application, U.S. Ser. No. 392,585, filed Aug. 29, 1973, on pages 5 and 6, the portions of which are hereby incorporated by reference. Other examples include the reaction product of diethanolamine, urea, formaldehyde and an alcohol, that is,

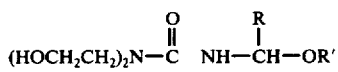

wherein R and R' are hydrogen or lower alkyl containing from 1 to 5 carbon atoms.

Also, active hydrogen-containing masked isocyanates such as aminimides, that is,

and active hydrogen-containing blocked isocyanates such as

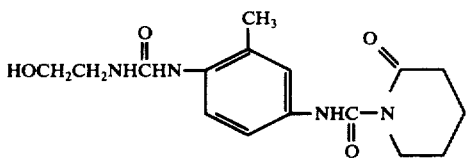

as well as active hydrogen-containing alkoxysilanes such as N-(2-aminoethyl)-3-aminopropyltriethoxysilane can also be employed.

The chain extended polyurethanes containing pendent or internal ethylenically unsaturated groups can be cured by exposure to UV radiation and/or reaction with free radical initiators, for example, benzoyl peroxide. Examples of pendent ethylenically unsaturated groups include acrylates, methacrylates and allyl compounds. These are usually incorporated into the polymer by reaction of NCO reactive groups, for example, N-tert-butylaminoethyl methacrylate, hydroxyethyl acrylate and diallyl amine. Examples of internal ethylenically unsaturated groups would include polyester polyols in which maleic anhydride is part or all of the acid moiety. These types of materials can be cured by microwave radiation and heat. Also, infrared or microwave radiation can be used to remove water and then ultraviolet or electron beam radiation used to cure. Curing can be accomplished with or without the presence of other vinyl monomers such as hydroxyethyl acrylate or ethylene glycol diacrylate with or without the presence of polymercaptans such as dithioethylene glycol.

Internal curing may also occur as the result of removal of a stabilizing ingredient. For example, polyvalent metal ions can be stabilized by the addition of volatile complexing agents. When the coating is applied, these agents evaporate, allowing the metal to bond at two or more sites on the polymer resulting in a crosslinked coating. An example of this would be the use of zinc or zirconium salts which are stabilized by the addition of excess ammonia. When a coating is applied, the ammonia evaporates resulting in a tough, crosslinked coating.

This same principle can be used to inactivate catalyst to achieve one-package stability. For example, toluene sulfonic acid which is used to catalyze curing with urea-formaldehyde resins can be inactivated with a volatile amine. When the coating is applied, the amine-acid complex is decomposed through volatilization of amine and the coating is cured.

It should be clear from the above that combinations of the various described internal curing agents or combinations of internal and external curing agents can be used to develop optimum crosslinked coatings. An example would be the use of internally contained blocked isocyanates and externally used melamine-formaldehyde resins to develop a coating of optimum hardness.

The amount of curing agent used would depend primarily on the final properties desired in the cured polymer film. In general, at least about one percent and preferably about 5 to 75 percent by weight of a curing agent or agents should be used, the percentage by weight being based on total weight of the polymer and curing agent.

Curing conditions can vary widely depending primarily on the curing agent used as well as the particular components of the composition. For heat curing, catalyst can be used to permit cure at lower temperatures and for shorter periods of time. In general, the cure schedule can be from as short as one minute to as long as several hours and from temperatures such as room temperature or 23° C. to elevated temperatures as high as 300° C.

In addition to the components mentioned above, the compositions ordinarily contain optional ingredients, including any of the various pigments ordinarily utilized in coatings. In addition, various fillers, plasticizers, antioxidants, flow control agents, surfactants and other such formulating additives can be employed. Although the products of the invention can be dispersed without the aid of conventional surfactants or emulsifying agents, it may be desirable in certain instances to add a surfactant or emulsifying agent to the dispersion for the purpose of effecting the final properties of the coating composition, for example, when an easily releasable coating is needed. For example, it has been found that the dispersions of the present invention are particularly useful as forming a plastic coating over returnable beverage bottles. When the bottle is dropped and broken, the plastic coating retains the glass and prevent it from shattering over a great distance. To be successful in this application, the coating should have a reduced degree of adhesion to the bottle so that it may act as a diaphragm and absorb the energy released from the breaking bottle. It has been found that the presence of minor amounts of surfactant in the dispersion sufficiently effect the adhesion of the resultant coating to the glass to result in a superior bottle coating.

In addition to the components mentioned above, the compositions ordinarily contain optional ingredients, including any of the various pigments ordinarily utilized in coatings of this general class. In addition, various, fillers, plasticizers, anti-oxidants, flow control agents, surfactants, and other such formulating additives can be employed in many instances.

The compositions herein can be applied by any conventional method, including brushing, dipping, flow coating, electrodeposition, electrostatic spraying, and the like, but they are most often applied by air spraying. The usual spray techniques and equipment are utilized. The coatings of the present invention can be applied over virtually any substrate, including wood, metals, glass, cloth, plastics, foam and the like, as well as over various primers.

EXAMPLE I

An acid-containing, NCO-containing prepolymer was prepared from the following charge:

| Charge | Parts by Weight |
|---|---|
| HYLENE W | 1645 |
| PCP-0230 | 1200 |
| FORMREZ L4-55 | 1200 |
| Ester Diol 204 | 100 |
| dimethylol propionic acid | 324 |
| dibutyltin dilaurate | 2.8 |
| m-pyrol | 1546 |

PCP-0230 is a poly(epsilon-caprolactone) diol of 1200 molecular weight, commercially available from Union Carbide Corporation. FORMREZ L4-55 is 1000 molecular weight 1,6-hexanediol adipate, commercially available from Witco Chemical Corp. Ester Diol 204 is an ester of neopentyl glycol and hydroxypivalic acid, commercially available from Union Carbide Corp.

The above charge was heated to 78° C., followed by addition of 88 parts by weight of trimethylol propane. The temperature was raised to about 100° C. in 1/2 hour, followed by the addition of 132 parts by weight of PCP-0301 (a polycaprolactone triol having a molecular weight of about 300 and commercially available from Union Carbide Corporation). The reaction mixture was maintained at a temperature between 90° and 100° C. for about one hour until the viscosity of the resin increased to 52.7 seconds (Gardner-Holdt). Then, 10 parts by weight of the resin and 5 parts by weight of N-methyl pyrrolidone were added to a solution of dimethylethanolamine and hydrazine hydrate to disperse, neutralize and chain extend the prepolymer. After the addition of the hydroxyl-containing, NCO-containing, acid-containing prepolymer was complete, hydroxyethyl ethylene imine was added and reacted with some of the free carboxyl groups at 80° C. for one hour to improve the compatibility and the adhesion of the resin.

EXAMPLE II

The hydroxyl-containing prepolymer of Example I was combined with 25 percent by weight of a metholated melamine-formaldehyde curing agent (CYMEL 370 from American Cyanamid). The resin plus curing agent was then spray applied on a steel substrate and when cured for 30 minutes at 250° F. (121° C.) formed a hard, glossy elastomeric coating of 1.5 mil thickness. The Sward hardness was 26 and the Gardner reverse impact was 160 inch-pounds.

EXAMPLE III

A hydroxyl-containing cationic resin was prepared by reacting a quaternary ammonium polyol with a polyisocyanate. The charge for making the quaternary ammonium polyol was as follows:

| Charge | Parts by Weight |
|---|---|
| phenyl glycidyl ether | 116 |
| dimethyl ethanolamine | 89 |
| 90 percent aqueous formic acid solution | 51 |

The dimethyl ethanolamine and formic acid were mixed and exothermed at 120° C. for about 30 minutes. The mixture was cooled to 100° C. and the phenyl glycidyl ether added. The mixture was exothermed at 150° C. for about 20 minutes, and then cooled to room temperature. The quaternary ammonium diol had an OH value of 244.

The cationic resin was prepared from the following charge:

| Charge | Parts by Weight |
|---|---|
| quaternary ammonium polyol | 135.3 |
| 1000 molecular weight 1,4-butanediol adipate | 275.0 |
| polyethylene glycol, molecular weight 200[1] | 27.5 |
| HYLENE W | 375.5 |
| N-methyl pyrrolidone | 530 |

[1]CARBOWAX 200 commercially available from Union Carbide Corporation.

[1]CARBOWAX 200 commercially available from Union Carbide Corporation.

The ingredients in the above charge were mixed together and heated to 60° C. for one hour to form a partially reacted NCO-containing polymer. The reaction mixture was then cooled, added to 960 parts by weight of deionized water containing 2.6 parts by weight of hydrazine hydrate to chain extend the partially reacted NCO-containing polymer. When stirred, the chain extended material gave a very fine dispersion of low viscosity.

EXAMPLE IV

Fifty (50) parts by weight of the aqueous polyurethane dispersion of Example III was cured with 6 parts by weight of CYMEL 370. The mixture was drawn down with a 3-mil draw bar on a steel panel and cured at 125° C. for 30 minutes to produce a flexible, impact-resistant film having a Sward hardness of 12.

We claim:

1. A stable aqueous dispersion which is emulsifiable in the absence of added emulsifier of a non-gelled polyurethane formed by reacting in the presence of water:
   A. a partially reacted NCO-containing polymer containing salt groups and highly active hydrogens selected from the group consisting of hydroxyl, thiol, primary and secondary amine, said partially reacted NCO-containing polymer having a reactive hydrogen equivalent weight of 150 to 10,000,
   B. an active hydrogen-containing compound having at least one hydrogen more reactive with NCO groups than water to form a polyurethane having an intrinsic viscosity of less than 4.0 deciliters per gram.

2. The aqueous dispersion of claim 1 in which the salt groups are acid salt groups.

3. The aqueous dispersion of claim 1 in which the salt groups are cationic in character.

4. The aqueous dispersion of claim 2 in which the salt groups are salts of carboxylic acids.

5. The aqueous dispersion of claim 3 in which the cationic salt groups are selected from the class consisting of

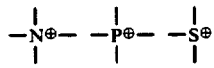

6. The aqueous dispersion of claim 1 in which the partially reacted NCO-containing polymer contains no more than 50 mole percent by weight of ethylene oxide moieties.

7. The aqueous dispersion of claim 1 in which the partially reacted NCO-containing polymer has an acid salt group equivalent weight of 150 to 20,000.

8. The aqueous dispersion of claim 2 in which the partially reacted NCO-containing polymer is dissolved in about 5 to 60 percent by weight organic solvent; the percentage by weight being based on total weight of solvent and partially reacted NCO-containing polymer.

9. The aqueous dispersion of claim 8 in which the organic solvent is water-soluble and at least part of the solvent has a boiling point above 150° C.

10. The aqueous dispersion of claim 8 in which the partially reacted NCO-containing polymer solution has a viscosity of from about 50 to 10,000 centipoises.

11. The aqueous dispersion of claim 1 in which the partially reacted NCO-containing polymer is the reaction product of an organic polyisocyanate and an organic compound having at least two active hydrogen atoms.

12. The aqueous dispersion of claim 11 in which the partially reacted NCO-containing polymer is the reaction product of an organic diisocyanate and an organic polyol or organic polyamine.

13. The aqueous dispersion of claim 12 in which the organic polyol contains at least in part a polyester polyol.

14. The aqueous dispersion of claim 11 in which the equivalent ratio of organic polyisocyanate to organic compound having at least two active hydrogen atoms is within the range of 7 to 0.5:1.

15. The aqueous dispersion of claim 1 in which the partially reacted NCO-containing polymer has a reactive hydrogen equivalent weight under the range of 150 to 8,000.

16. The aqueous dispersion of claim 1 in which the dispersed phase has a particle size of less than 5 microns.

17. The aqueous dispersion of claim 1 in which the NCO-containing polymer is reacted with a polyfunctional active hydrogen-containing compound having at least two hydrogens which are more reactive with NCO groups than water.

18. The aqueous dispersion of claim 17 in which the partially reacted NCO-containing polymer is reacted in said aqueous medium with a difunctional active hydrogen-containing compound having two hydrogens more reactive with NCO groups than water.

19. The aqueous dispersion of claim 1 in which the active hydrogen-containing compound is a primary or secondary polyamine.

20. The aqueous dispersion of claim 19 in which the polyamine is a diamine.

21. The aqueous dispersion of claim 1 in which the active hydrogen-containing compound is hydrazine, a substituted hydrazine or a hydrazine reaction product.

22. The aqueous dispersion of claim 19 in which the active hydrogen-containing compound is an alkanolamine.

23. The aqueous dispersion of claim 1 in which the equivalent ratio of active hydrogen-containing compounds to the partially reacted NCO-containing polymer is within the range of 0.5 to 2:1.

24. The aqueous dispersion of claim 1 in which the polyurethane contains unsaturated fatty acid moieties.

25. The aqueous dispersion of claim 1 which contains curing groups in the polymer molecule.

26. The aqueous dispersion of claim 25 in which the curing groups are selected from the class consisting of N-alkoxymethyl moieties, blocked isocyanate moieties, masked isocyanate moieties, alkoxysilane moieties, epoxy moieties and moieties containing ethylenic unsaturation.

27. The aqueous dispersion of claim 25 which is applied as a coating and treated with microwave with or without ultraviolet radiation.

28. An aqueous coating composition comprising:
A. stable aqueous dispersion which is emulsifiable in the absence of added emulsifier of an ungelled NCO-free polyurethane formed by reacting in the presence of water:
 1. a partially reacted NCO-containing polymer containing salt groups and reactive active hydrogens selected from the group consisting of hydroxyl, thiol, primary and secondary amine, said polymer having a reactive active hydrogen equivalent weight of 150 to 10,000,
 2. an active hydrogen-containing compound having at least one hydrogen more reactive with NCO groups than water to form a polyurethane having an intrinsic viscosity of 2.0 deciliters per gram or less;
B. a curing agent.

29. The composition of claim 28 in which the curing agent is selected from the class consisting of aminoplasts, polyisocyanates, phenolic resins or epoxy-containing materials.

30. The composition of claim 28 in which the reactive active hydrogens are hydroxyl groups and the curing agent is selected from the class consisting of aminoplasts, polyisocyanates, or phenolic resins.

31. The composition of claim 28 in which the reactive active hydrogens are amino and curing agent is an epoxy-containing material or a polyisocyanate.

32. The composition of claim 28 which is applied as a coating and treated with microwave with or without ultraviolet radiation.

33. The composition of claim 28 which is applied as a coating by electrodeposition.

34. The composition of claim 28 which is applied as a coating by electrostatic spraying.

35. A method of forming a stable aqueous dispersion which is emulsifiable in the absence of added emulsifier of an ungelled polyurethane comprising:
A. preparing a partially reacted NCO-containing polymer containing ionic salt groups or groups which are capable of forming ionic salt groups and highly active hydrogens selected from the group consisting of hydroxyl, thiol, primary and secondary amine, said partially reacted NCO-containing polymer having a highly active hydrogen equivalent weight of 150 to 10,000,
B. dispersing said partially reacted NCO-containing polymer in aqueous medium in which water is the principal ingredient,
C. chain extending the NCO-containing polymer with an active hydrogen-containing compound having at least one hydrogen more reactive with the NCO groups than water to form a polyurethane having an intrinsic viscosity of 4.0 deciliters per gram or less.

* * * * *